United States Patent [19]

Gray et al.

[11] Patent Number: 5,364,921
[45] Date of Patent: Nov. 15, 1994

[54] SILICONE RUBBER WITH SELF-ADHESION TO GLASS AND METAL

[75] Inventors: Thomas E. Gray, Midland, Mich.; Michael E. Kunselman, Ichihara, Japan; Richard A. Palmer, Midland, Mich.

[73] Assignee: Dow Corning Corporation, Midland, Mich.

[21] Appl. No.: 107,494

[22] Filed: Aug. 17, 1993

[51] Int. Cl.$^5$ ............................................. C08G 77/06
[52] U.S. Cl. .................................... 528/15; 156/307.1; 156/329; 524/265; 524/267; 524/730; 524/731; 524/757; 528/17; 528/25; 528/32
[58] Field of Search .................. 156/307.1, 329; 524/730, 731, 265, 267, 755, 757; 528/15, 17, 25, 32

[56] References Cited

U.S. PATENT DOCUMENTS

| | | | |
|---|---|---|---|
| 4,332,844 | 6/1982 | Hamada et al. | 427/387 |
| 4,659,851 | 4/1987 | Plueddemann | 556/431 |
| 4,719,262 | 1/1988 | Plueddemann | 525/105 |
| 4,737,562 | 4/1988 | Chaudhury et al. | 528/15 |
| 4,754,013 | 6/1988 | Antonen | 528/15 |
| 4,906,686 | 3/1990 | Suzuki et al. | 524/730 |
| 5,006,580 | 4/1991 | Kasuya | 524/264 |
| 5,023,288 | 6/1991 | Hirai | 524/268 |

*Primary Examiner*—Melvyn I. Marquis
*Attorney, Agent, or Firm*—Roger H. Borrousch

[57] ABSTRACT

A composition curable to a silicone rubber exhibits adhesion to metal and glass substrates under both dry and wet conditions where the composition contains an alkenyl-containing polydiorganosiloxane, an organohydrogensiloxane, a hydrosilation catalyst containing platinum, an (epoxy-functional organo)trialkoxysilane, an alkoxy-silicon compound, and a titanium compound having Ti—O—CH bonds and the molar amount of alkoxy-silicon compound exceeds the molar amount of (epoxyfunctional organo)trialkoxysilane.

17 Claims, 1 Drawing Sheet

SILICONE RUBBER WITH SELF-ADHESION TO GLASS AND METAL

BACKGROUND OF THE INVENTION

1. Field of the Invention

This invention relates to liquid silicone compositions curable to rubber. The cured silicone rubber provides a unique combination of properties including unprimed adhesion to a variety of substrates, such as glass and stainless steel.

2. Background Information

Liquid silicone compositions curable to rubber based upon vinyl-containing polydiorganosiloxane polymer, organohydrogensiloxanes having silicon-bonded hydrogen atoms, and platinum catalyst are well known in the art of silicone elastomer compositions. Such compositions are also well known for their reluctance to adhere to substrates against which the composition is cured. Many additives have been developed to obtain good adhesion of such compositions to a variety of substrates, however the additives are, for the most part, selective to compositions in which they are effective and to substrates upon which such compositions are cured. Many approaches are found in the prior art to solve the problem of adhering such addition-curable silicone compositions to substrates. Whereas some of these solutions use the primer approach and some of these solutions use the approach of adding an adhesion promoter to the composition and whereas each of these prior art solutions do have merit, these solutions did not provide the rapid cure needed at low temperatures, comparable adhesion to both glass and stainless steel substrates and the durability of the bond under adverse conditions.

Hamada et al in U.S. Pat. No. 4,332,844, issued Jun. 1, 1982, teach compositions which can be either primers or adhesion promoters for adhering silicone rubber to substrates. The compositions are prepared from an alkoxy-containing silicon compound, an organotitanate, an organohydrogensilicon compound, and optionally an organic solvent. Examples of the alkoxy-containing silicon compound are Si(OEt)$_4$, Si(OPr)$_4$, MeSi(OEt)$_3$, PhSi(OMe)$_3$, ViSi(OMe)$_3$, ethylpolysilicate, (Vi)$_2$Si(OMe)$_2$, CF$_3$CH$_2$CH$_2$Si(OEt)$_3$,

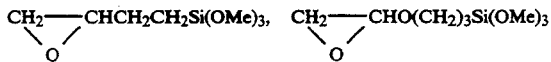

HSCH$_2$CH$_2$CH$_2$Si(OMe)$_3$,
H$_2$NCH$_2$CH$_2$CH$_2$Si(OMe)$_3$,
H$_2$NCH$_2$CH$_2$NHCH$_2$CH$_2$CH$_2$Si(OMe)$_3$ and the like. In these formulae and as used elsewhere herein, Me is the methyl radical, Et is the ethyl radical, Pr is the propyl radical, Ph is the phenyl radical, and Vi is the vinyl radical.

Plueddemann in U.S. Pat. No. 4,659,851, issued Apr. 21, 1987, and in U.S. Pat. No. 4,719,262, issued Jan. 12, 1988, teaches adhesion promoters added to polyorganosiloxane compositions which cure by a hydrosilation reaction. The amount of adhesion promoter is from 0.1 to 10 percent by weight. Plueddemann teaches that these adhesion promoters are reaction products of an unsaturated alcohol or phenol and an alkoxysilane which is catalyzed by an organic amine, tin compounds, and titanium compounds. Examples of the unsaturated alcohols are 10-undecenol, eugenol, hydroxyethyl acrylate, hydroxypropyl acrylate, monoallyl ether of 1,1,1-trimethylolpropane, diallyl ether of 1,1,1-trimethylolpropane, 2-allyloxy-1-ethanol, and o-allylphenol. Examples of alkoxy-silanes are tetramethoxysilane, methyltrimethoxysilane, phenyltrimethoxysilane, tetraethoxysilane, and 1,2-bis(tri-methoxysilyl)ethane. Examples of catalysts are stannous octoate, dibutyltin dilaurate, and tetrabutyl titanate. These reaction products were useful for bonding hydrosilation cured silicone rubber to brass, aluminum, cold rolled steel, and glass, except that reaction products containing tetraethoxy-silane did not provide cohesive adhesion to cold rolled steel.

An adhesion promoter which is useful in platinum-catalyzed hydrosilation reaction cured polyorganosiloxane compositions is taught by Chaudhury in U.S. Pat. No. 4,737,562, issued Apr. 12, 1988. The adhesion promoter is a combination of 1,2-bis(trialkoxysilyl)ethane, an unsaturated alkoxysilicon compound, such as silanes and reaction product of an alkoxysilicon compound and an alcohol containing unsaturated organic compound, and a catalyst which will promote hydrolysis and condensation of organosilicon compounds containing hydrolyzable groups. The catalysts include alkali metal hydroxides, alkali metal silanoates, organic amines, Lewis basis such as alkali metal carbonates and bicarbonates, acids such as sulfuric acid, phosphoric acid, acetic acid, proponic acid, methanesulfonic acid, aluminum chloride, organotin compounds, and titanium compounds. The titanium compounds are particularly effective when platinum catalysts are used for the hydrosilation curing reaction because they do not poison the catalytic activity of the platinum catalyst. Some of the adhesion promoter combinations disclosed by Chaudhury et al are 1,2-bis(tri-methoxysilyl)ethane, tetrabutyl titanate with one of the following compounds, 6-trimethoxysilyl-1,2-hexene, allyltri-methoxysilane, vinyltrimethoxysilane, a reaction product of diallyl ether of trimethylolpropane and methyltrimethoxysilane, a reaction product of monoallyl ether of trimethylolpropane and methyl orthosilicate, and a reaction product of monoallyl ether of trimethylolpropane and methyltrimethoxysilane where in the reaction products are made using tetrabutyl titanate as a catalyst. Hydrosilation curable compositions which contain such adhesion promoters are useful for promoting cohesive adhesion to aluminum.

Antonen teaches in U.S. Pat. No. 4,454,013, issued Jun. 28, 1988, a combination of a polyorganosiloxane composition curable by a platinum catalyzed hydrosilation reaction with a polyorganosiloxane composition containing a liquid hydroxyl-terminated polydiorganosiloxane, a moisture reactive organosilicon crosslinking agent, and an organotitanate catalyst. This combination provides cohesive bonds to inorganic substrates such as glass and metal. Antonen also teaches that other adhesion promoters can be used such as silanes which contain at least two silicon bonded alkoxy groups and an silicon bonded organofunctional group such as vinyl or gamma-methacryloxypropyl.

An addition-curable composition provides excellent bonding to various substrates is described by Suzuki et al in U.S. Pat. No. 4,906,686, issued Mar. 6, 1990. The bonding according to Suzuki et al is provided by a mixture or reaction product of a silicon-free compound which contains at least one alcoholic hydroxyl group and at least one alkenyl group in each molecule and an organosilane having in each molecule at least one alkoxy group and at least one epoxy or methacryloxy or acryloxy group. Examples of the silicon-free compound are allyl alcohol, ethylene glycol monoallyl ether, glycerol monoallyl ether, glycerol diallyl ether, diglycerol monoallyl ether, diglycerol diallyl ether, diglycerol triallyl ether, trimethyl-olpropane monoallyl ether, trimethylolpropane diallyl ether, pentraerythriol monoallyl ether, pentraerythriol diallyl ether, and pentraerythriol triallyl ether. Examples of organosilanes are 3-glycidoxypropyltrimethoxysilane, 3-glycidoxypropyltriethoxysilane, 2-(3,4-epoxycyclohexyl)ethyl-trimethoxysilane, 2-(3,4-epoxycyclohexyl)ethyltriethoxysilane, 3-methacryloxypropyl-trimethoxysilane, 3-methacryloxypropyltriethoxysilane, 3-acryloxypropyltrimethoxysilane, and 3-acryloxypropyltriethoxy-silane. The reaction products can be made by using a catalyst such as metal catalysts such as titanate esters, tin carboxylates, basic catalysts, and acid catalysts. The compositions bond to many substrates such as glasses, metals, metal oxides, and resins.

A self-bonding composition is taught Kasuya in U.S. Pat. No. 5,006,580, issued Apr. 9, 1991, in which the additives are a carbonyl complex of a Group VIB element and a silicon compound containing a silicon-bonded alkoxy group which is selected from the group consisting of silanes or siloxane oligomers. The silicon compound can contain an epoxy functional group. Kasuya teaches that epoxysilane as an additive doesn't promote adhesion when used in a curable composition to epoxy glass, polyphenylene sulfide, that 1,2-bis(-trimethoxysilyl)ethane as an additive doesn't promote adhesion when used in a curable composition to nylon-6 and polycarbonate, and that 1-acryloxymethyltrimethoxysilane doesn't promote adhesion when used in a curable composition to nylon-6, polyphenylene sulfide, and polycarbonate.

A silicone rubber adhesive is described by Hirai in U.S. Pat. No. 5,023,288, issued Jun. 11, 1991, contains an organopolysiloxane having at least two silicon-bonded alkenyl groups per molecule, an organohydrogenpolysiloxane having at least two silicon-bonded hydrogen atoms per molecule, reinforcing silica, acryl-functional silane coupling agent or methacryl-functional silane coupling agent, an epoxy-functional coupling agent, a partial allyl ether of a multivalent alcohol, and a platinum catalyst.

SUMMARY OF THE INVENTION

This invention relates to a silicone composition curable to a rubber comprising (A) 100 parts by weight of an alkenyl-containing polydiorganosiloxane having an average of at least two silicon-bonded alkenyl radicals per molecule where the alkenyl radical has from 2 to 10 inclusive carbon atoms per radical, each organo radical of the polydiorganosiloxane being a monovalent radical selected from the group consisting of hydrocarbon radicals and fluorinated alkyl radicals both having less than 7 carbon atoms per radical, the polydiorganosiloxane having triorganosiloxy endgroups, (B) an organohydrogensiloxane having an average of at least 3 silicon-bonded hydrogen atoms per molecule and valences of any silicon atom in the organohydrogensiloxane not satisfied by a hydrogen atom is satisfied by a divalent oxygen atom or an organo radical wherein each organo radical is a monovalent radical selected from the group consisting of hydrocarbon radicals and fluorinated alkyl radicals both having less than 7 carbon atoms per radical, the organohydrogensiloxane having no more than one silicon-bonded hydrogen atom on any one silicon atom, the amount of organohydrogensiloxane providing a ratio of silicon-bonded hydrogen atoms to alkenyl groups from the polydiorganosiloxane of 1.2 to 2, (C) a hydrosilation catalyst containing platinum, (D) 0.1 to 1 part by weight of an (epoxy-functional organo)trialkoxysilane where the alkoxy radicals of the (epoxy-functional organo)trialkoxy-silane have 1 to 4 inclusive carbon atoms, (E) 0.25 to 5 parts by weight of an alkoxy-silicon compound selected from tetraalkyl orthosilicates, alkylpoly-silicates and alkoxy-silicon compounds of the general formula

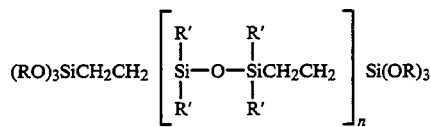

wherein n is 0 or 1, R is an alkyl radical of 1 to 4 inclusive carbon atoms and R' is a monovalent hydrocarbon radical, where the alkyl groups of the tetraalkyl orthosilicates and the alkylpolysilicates are methyl, ethyl, propyl or butyl, and (F) 0.01 to 0.5 part by weight of a titanium compound having Ti—O—CH bonds, where the total amount of ingredient (D) and ingredient (E) is from 0.5 to 6 parts by weight and the molar amount of (E) exceed the molar amount of (D).

Another preferred embodiment of this invention is a method of adhering a glass substrate to a stainless steel substrate comprising (1) mixing (A) 100 parts by weight of an alkenyl-containing polydiorganosiloxane having an average of at least two silicon-bonded alkenyl radicals per molecule where the alkenyl radical has from 2 to 10 inclusive carbon atoms per radical, each organo radical of the polydiorganosiloxane being a monovalent radical selected from the group consisting of hydrocarbon radicals and fluorinated alkyl radicals both having less than 7 carbon atoms per radical, the polydiorganosiloxane having triorganosiloxy endgroups, (B) an organohydrogensiloxane having an average of at least 3 silicon-bonded hydrogen atoms per molecule and valences of any silicon atom in the organohydrogensiloxane not satisfied by a hydrogen atom is satisfied by a divalent oxygen atom or an organo radical wherein each organo radical is a monovalent radical selected from the group consisting of hydrocarbon radicals and fluorinated alkyl radicals both having less than 7 carbon atoms per radical, the organohydrogensiloxane having no more than one silicon-bonded hydrogen atom on any one silicon atom, the amount of organohydrogensiloxane providing a ratio of silicon-bonded hydrogen atoms to alkenyl groups from the polydiorganosiloxane of 1.2 to 2, (C) a hydrosilation catalyst containing platinum, (D) 0.1 to 1 part by weight of an (epoxy-functional organo)-trialkoxysilane where the alkoxy radicals of the (epoxy-functional organo)trialkoxy-silane have 1 to 4 inclusive carbon atoms, (E) 0.25 to 5 parts by weight of an alkoxy-silicon compound selected from tetraalkyl orthosilicates, alkylpoly-silicates and alkoxy-silicon compounds of the general formula

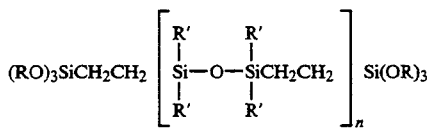

wherein n is 0 or 1, R is an alkyl radical of 1 to 4 inclusive carbon atoms and R' is a monovalent hydrocarbon radical, where the alkyl groups of the tetraalkyl orthosilicates and the alkylpolysilicates are methyl, ethyl, propyl or butyl, and (F) 0.01 to 0.5 part by weight of a titanium compound having Ti—O—CH bonds, where the total amount of ingredient (D) and ingredient (E) is from 0.5 to 6 parts by weight and the molar amount of (E) exceed the molar amount of (D), to make a curable silicone rubber composition, (2) applying the curable silicone rubber composition to a glass substrate and a stainless steel substrate such that the glass and stainless steel substrates are connected by curable silicone rubber composition making an assembly, and thereafter (3) maintaining the assembly in position until the silicone rubber composition has cured thereby bonding the glass substrate to the stainless steel substrate through cured silicone rubber.

DRAWING NUMERICAL AND ALPHABETICAL REFERENCE LIST

Figure 1:
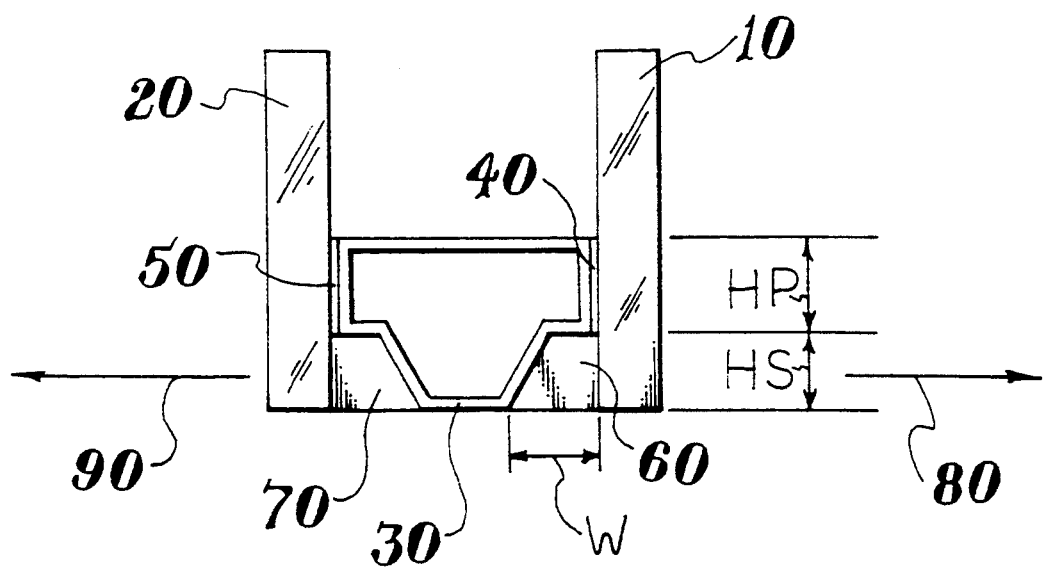
FIG. 1 is an end view of an H-test piece.

10 Glass pane
20 Glass pane
30 Stainless steel spacer
40 Polyisobutylene primary seal
50 Polyisobutylene primary seal
60 Silicone rubber secondary seal
70 Silicone rubber secondary seal
80 First direction force is applied during adhesion test
90 Second direction force is applied during adhesion test
L Length of primary seal and secondary seal
HP Height of primary seal
HS Height of secondary silicone rubber seal
W Width of secondary silicone rubber seal

DETAILED DESCRIPTION OF THE PREFERRED EMBODIMENTS

This invention relates broadly to a silicone compositions curable to rubber comprising an alkenyl-containing polydiorganosiloxane having an average of at least two silicon-bonded alkenyl groups per molecule, an organohydrogensiloxane having an average of at least 3 silicon-bonded hydrogen atoms per molecule, a hydrosilation catalyst containing platinum, and additives which promote the adhesion to substrates against which it is cured, especially glass and stainless steel. It is the additives which provide the adhesion characteristics, the bond durability under adverse conditions over extended periods of time, do not deteriorate other cure properties or mechanical and chemical properties nor hinder their development, such as fast curing at low temperatures and heat accelerateable curing, such as curable in less than 5 minutes at 80° C. or in one to two hours at room temperature.

These silicone compositions curable to silicone rubber are dispensed onto substrates while uncured, then are cured in place. They are required to adhere to substrates, which may be metal or glass. Through extensive investigation, it was discovered that certain combinations of additives in defined amounts can be added to silicone compositions to produce new compositions which have adhesion to substrates upon which they are cured. In these silicone compositions curable by the hydrosilation reaction, the ratio of hydrogen on silicon to alkenyl on silicon is within certain limits to accommodate the adhesion additives and produce the unique combination of adhesion and cure properties.

Ingredient (A) of the silicone composition of this invention is primarily a linear polymer of one or more alkenyl-containing polydiorganosiloxanes containing at least two alkenyl groups having from 2 to 10 carbon atoms such as vinyl, allyl, 3-butenyl, 4-pentenyl, 5-hexenyl, 7-octenyl, and/or 9-decenyl groups. In order for the polymer to properly crosslink, at least 2 alkenyl groups per molecule are needed. Generally the polydiorganosiloxane is diorganoalkenylsiloxy terminated with the alkenyl group such as a vinyl group. The alkenyl radical contains at least two carbon atoms and can be represented by the formula —R$_s$CH=CH$_2$, where R represents an alkylene radical containing from 1 to 8 carbon atoms and s is 0 or 1. The alkylene radical can be linear or branched. The preferred alkenyl groups are vinyl and hexenyl. Polydiorgano-siloxanes which have a combination of vinyl and hexenyl are preferred as the ratio of the hexenyl to vinyl can be used to regulate the rate of cure, for example increasing the amount of hexenyl containing polydiorganosiloxane in ingredient (A) increases the rate of cure.

The organo groups of the polydiorganosiloxane are individually monovalent hydrocarbon radicals or fluorinatedmonovalent hydrocarbon radicals containing from 1 to 6 carbon atoms. The organo radicals can be identical or different, such as methyl or ethyl, fluorinated alkyl such as 3,3,3-trifluoro-propyl, cycloalkyl such as cyclohexyl, or aryl such as phenyl. A preferred radical is the methyl radical.

Generally the siloxane is polymerized to a viscosity of from 2 to 100 Pa.s at 25° C., preferably from 2 to 50 Pa.s. It is possible to use either higher or lower viscosity polymers.

A single polydiorganosiloxane or a mixture of different polymers can be used. Ingredient (A) can be a mixture of polydiorganosiloxanes which can include, for example, as a second polymer a liquid diorganoalkenyl-siloxy-terminated polydiorganosiloxane that is represented by the average general formula

wherein R$^3$ represents a terminally unsaturated alkenyl radical containing at least four, preferably at least six, carbon atoms and R$^4$ is selected from the same group of monovalent hydrocarbon radicals and fluorinated monovalent hydrocarbon radicals as in the polydiorganosiloxane above. The preference for six carbon atoms for R$^3$ is based on the availability of the starting material, typically the corresponding chlorosilane, for preparing polydiorganosiloxanes containing this radical bonded to a portion of the silicon atoms. R$^3$ can be represented by the general formula —R"CH=CH$_2$, where R" represents an alkylene radical containing at least 2 and preferably at least 4 carbon atoms. The radical represented by R" can be linear or branched. Examples of R$^3$ include 3-butenyl, 4-pentenyl, 5-hexenyl, 7-octenyl, 9-decenyl and 9-decenyl. Methods for preparing the polydiorganosiloxanes are sufficiently disclosed in the patent and other literature such that a detailed description in this specification is not necessary.

The physical properties of the cured rubber are affected by the polymer size or viscosity used as well as the amount of crosslinking. For example, use of polymer mixtures having one polymer with only terminal vinyl groups and another polymer with both terminal vinyl groups and pendant vinyl groups on the chain is taught by Jensen in U.S. Pat. No. 4,753,978, issued Jun. 28, 1988. Jensen et al in U.S. Pat. No. 4,946,878, issued Aug. 7, 1990, and Gray et al in U.S. Pat. No. 5,110,845, issued May 5, 1992, teach the use of an alkenyl radical having at least 4 carbon atoms. These patents are incorporated by reference to show polydiorganosiloxanes and their mixtures which can be used in this invention.

In addition to ingredient (A), an alkenyl-containing siloxane resin can be present in the composition. Such siloxane resins can be used to increase the tensile strength and the tear strength of the curable silicone compositions of this invention. Examples of these types of siloxane resins are those made up of the following siloxane units, ViMe$_2$SiO$_{0.5}$, Me$_3$SiO$_{0.5}$, and SiO$_{4/2}$ where ratio of ViMe$_2$SiO$_{0.5}$ and Me$_3$SiO$_{0.5}$ units to SiO$_{4/2}$ units is from 0.4:1 to 1.2:1 and the amount of vinyl group is from 1.5 to 3.5 weight percent based on the weight of siloxane resin. Amounts can be widely varied, but are usually less than 50 weight percent of the weight of the curable silicone composition.

The crosslinking agent, (B), is an organohydrogensiloxane containing an average of at least three silicon-bonded hydrogen atoms per molecule. The organohydrogensiloxane contains from as few as four silicon atoms per molecule up to an average of 100 or more, and can have a viscosity of up to 10 Pa.s or higher at 25° C. The repeating units of this ingredient include but are not limited to HSiO$_{1.5}$, R$^1$HSiO and/or R$^1{}_2$HSiO$_{0.5}$ in addition to one or more of R$^1$SiO$_{1.5}$, R$^1{}_2$SiO, R$^1{}_3$SiO$_{0.5}$, and SiO$_{4/2}$ units. In these formulas R$^1$ represents a monovalent hydrocarbon or fluorinated radicals as defined above for R$^4$ of the polydiorganosiloxane.

The organohydrogensiloxane can be linear copolymer of diorganosiloxane units and organohydrogensiloxane units end-blocked with triorganosiloxy units or monohydrogendiorganosiloxy units, a cyclic compound containing both diorganosiloxane and organohydrogensiloxane units or a compound of the formula Si(OSiR$^4{}_2$H)$_4$.

Proper curing of the present composition requires that the polydiorganosiloxane (A), organohydrogensiloxane (B) and hydrosilation catalyst (C) be miscible with one another. To ensure sufficient miscibility, it is preferred that a majority of the silicon-bonded hydrocarbon radicals that are present in the higher concentration in the polydiorganosiloxane and organohydrogensiloxane be selected from the same class, e.g. alkyl radical. In particularly preferred compositions, these hydrocarbon radicals are methyl or combinations of methyl with either 3,3,3-trifluoropropyl or phenyl.

The molar ratio of silicon-bonded hydrogen atoms to alkenyl radical (vinyl or other ethylenically unsaturated hydrocarbon radicals) in compositions curable by a hydrosilation reaction is important with respect to the properties of the cured elastomer. The optimum ratio for the present curable compositions will be determined at least in part by the molecular weight of the polydiorganosiloxane and the type of curing agent. An effective molar ratio of silicon-bonded hydrogen atoms to silicon-bonded alkenyl radicals is in the range of 1.2 to 2 with a preferred range of 1.6 to 2.

Hydrosilation reactions are typically conducted in the presence of a catalyst containing platinum, (C). Platinum compounds such as hexachloroplatinic acid, and particularly complexes of these compounds with relatively low molecular weight vinyl-containing organosiloxane compounds are preferred catalysts because of their high activity and compatibility with the organosiloxane reactants. These complexes are described in Willing U.S. Pat. No. 3,419,593, issued Dec. 31, 1968.

The platinum-containing catalyst can be present in an amount equivalent to as little as one part by weight of platinum per one million parts by weight of curable composition. Catalyst concentrations equivalent to from 5 to 100 parts of platinum per million of curable composition are preferred to achieve a practical curing rate. Higher concentrations of platinum provide only marginal improvement in curing rate, and are therefore economically unattractive.

Mixtures of the aforementioned polydiorganosiloxane, crosslinking agent and platinum catalyst may begin to cure at ambient temperatures. It is therefore desirable to package the ingredients in at least two separate containers. Usually a first container comprises the alkenyl-containing polydiorgano-siloxane and platinum catalyst and a second container comprises the polyorganohydrogensiloxane. Although a rapid cure rate is desired for the present invention, in certain situations one may wish to slow the curing reaction down at room temperature and if this is desired, the addition reaction catalyzed by the platinum catalyst can be slowed by adding an inhibitor such as those which are known to inhibit the hydrosilation reaction at room temperatures. Longer working time or "pot life", can be obtained by the addition of a suitable inhibitor. Known inhibitors include the acetylenic compounds disclosed in U.S. Pat. No. 3,445,420, issued May 20, 1969. Acetylenic alcohols such as 2-methyl-3-butyn-2-ol and ethynyl cyclohexanol constitute a preferred class of inhibitors that will suppress the activity of a platinum-containing catalyst at 25° C., but cure rapidly at temperatures of 70° C. or higher.

In order to obtain satisfactory levels of physical strength, the silicone compositions comprising the polydiorganosiloxane can contain a particulate filler. The silicone compositions are commonly reinforced with one or more fillers such as fumed silica. Any finely divided form of silica can be used as a reinforcing filler. Colloidal silicas are preferred because of their relatively high surface area, which is typically at least 50 square meters per gram. Fillers having surface areas of at least 250 square meters per gram are preferred for use in the present method. Colloidal silicas can be prepared by precipitation or a fume process. Both of these preferred types of silica are commercially available.

The amount of finely divided silica used in the present compositions is at least in part determined by the physical properties desired in the cured rubber. Liquid or pumpable silicone compositions typically contain from about 10 to about 60 percent by weight of silica, based on the weight of polydiorganosiloxane.

Preferably, if reinforcing filler is used, it is modified with silica treating agents to prevent a phenomenon referred to as "creping" or "crepe hardening" during processing of the curable composition and to provide a product which has greater stability during storage. These silica treating agents can be liquid hydroxyl terminated polydiorganosiloxanes containing an average of from 2 to about 20 repeating units and can contain an alkenyl radical. Treating agents can also be organosilicon compounds such as hexaorganodisiloxanes and hexaorganodisilazanes such as hexamethyldisilazane and hydrolyze under the conditions used to treat the silica to form compounds with silicon-bonded hydroxyl groups. Small amounts of water are often added to the composition during the filler treatment step to facilitate the process.

The filler can also be a non-reinforcing or extending filler of finely ground particles of oxides or hydroxides or carbonates of such as silicon, calcium, magnesium, barium, or zinc, with silicon oxide (quartz) and calcium carbonate as preferred non-reinforcing fillers. Suitable fillers for silicone elastomeric compositions are well known in the art.

To enhance the adhesion of the cured rubber to substrates, the silicone composition comprises a titanium compound, an alkoxy silicon compound, an (epoxy-functional organo)trialkoxysilane, and optionally unsaturated silanes such as gamma-methacryloxypropyltrialkoxysilane and/or unsaturated non-silicon containing ether such as diallyl ether of trimethylolpropane. The combination of these components in controlled amounts is found important in providing sufficient initial adhesion to substrates such as glass and stainless steel and providing rapid cure between ambient temperatures and 100° C. Using this combination, also provides wet adhesion which is significantly improved over various prior art adhesion additives. Compositions containing these components is found particularly useful for use with glass and metal substrates, such as stainless steel.

The (epoxy functional organo)trialkoxysilane ingredient (D) is a trialkoxysilane functionalized with an organic substituent containing an epoxy group. Typically the alkoxy radicals of the (epoxy functional organo)trialkoxysilane may be the same or different and are usually selected from alkoxy radicals having 1 to 4 carbon atoms such that the alkoxy radicals are readily hydrolyzable upon contact with water. For example, the alkoxy radicals may include methoxy, ethoxy, propoxy, and butoxy. The structure of the organic substituent bearing the epoxy group may vary. Commercially available useful (epoxy functional organo)trialkoxysilanes include 3-glycidoxypropyltrimethoxysilane and beta-(3,4-epoxycyclohexyl)ethyltrimethoxysilane. 3-glycidoxypropyltrimethoxysilane is preferred because of its effectiveness.

The amount of ingredient (D) used is typically 0.1 to 1 part by weight per 100 parts by weight of polydiorganosiloxane in the composition. Both dry and wet adhesion of the cured silicone rubber to substrates increases with increased amounts of ingredient (D). Amounts of ingredient (D) exceeding one part by weight per 100 parts by weight of ingredient (A) may be detrimental to the adhesion properties of the cured silicone rubber to glass and metal substrates. Preferred silicone compositions contain 0.2 to 0.5 part by weight of ingredient (D) per 100 parts by weight of ingredient (A).

The alkoxy-silicon compound, ingredient (E), can be an alkyl orthosilicate or a partially hydrolyzed alkyl orthosilicate where the alkyl groups have up to about 4 carbon atoms. The alkyl groups may be the same or different. Alkyl orthosilicates include ethyl orthosilicate, methyl orthosilicate, n-propyl orthosilicate, and butyl orthosilicate. The partial hydrolyzed alkyl orthosilicates are also known as alkylpolysilicates which include, for example, ethylpolysilicate, n-propylpolysilicate and butylpolysilicate. Alkoxy-silicon compound (D) can also be a compound of the general formula

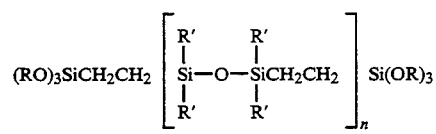

wherein n is 0 or 1, R is an alkyl radical of 1 to 4 inclusive carbon atoms, such as methyl, ethyl, propyl, and butyl, and R' is a monovalent hydrocarbon radical as alkyl, for example, methyl, ethyl and hexyl, and aryl such as phenyl. Preferable both R and R' are methyl. The alkoxy-silicon compound is present in an amount of 0.25 to 5 parts by weight per 100 parts by weight of ingredient (A). It is preferred for improved adhesion to use from 0.4 to 3 parts of ethylpolysilicate or n-propyl orthosilicate. The combined amount of (epoxy functional organo)trialkoxysilane and alkoxy-silicon compound should be at least 0.5 part by weight per 100 parts by weight of ingredient (A), preferably from 0.5 to 6 parts by weight. It is also necessary to have the molar amount of alkoxy-silicon compound (E) exceed the molar amount of (epoxy functional organo) trialkoxysilane to provide satisfactory adhesion. If both the (epoxy functional organo)trialkoxysilane and the alkoxy-silicon compound are at their lower limits, poor adhesion is obtained.

The silicone compositions of this invention include a titanium compound having Ti—O—CH bonds, (F). These titanium compounds aid in the shortening of time for development of adhesion between the cured silicone rubber and the substrates. Examples of titanium compounds include tetra-alkyltitanates such as tetraisopropyltitanate, tetrabutyltitanate, and tetraoctyltitanate, tetraisopropyltitanate, and tetra-2-ethylhexyl titanate; chelated titanates such as

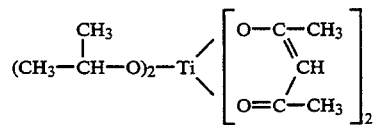

and other titanium compounds such as $(CH_2CH_2CH_2O)_3TiOTi(OCH_2CH_2CH_3)_3$. The amounts of titanium compound (F) can be from 0.01 to 0.5 part by weight per 100 parts by weight of ingredient (A), preferably from 0.05 to 0.3 part by weight.

The silicone compositions of this invention can optionally contain an olefinically unsaturated alkoxy silane, (G). These olefinically unsaturated alkoxy silanes can be illustrated by gamma-methacryloxypropyltrialkoxysilane, vinyltrialkoxysilane, hexenyltrialkoxysilane, and the like in which the alkoxy groups preferably contain from 1 to 4 carbon atoms per alkoxy group, such as methoxy, ethoxy, propoxy, and butoxy. These olefinically unsaturated alkoxy silanes can be present in amounts up to about 1 weight percent based on the weight of the silicone composition, preferably from 0.1 to 1 weight percent.

The silicone compositions of this invention can also optionally contain an unsaturated non-silicon-containing ether, (H). Examples illustrating such unsaturated non-silicon-containing ethers are diallyl ether of trimethylolpropane, monoallyl ethyl of trimethylolpropane, monoallyl ether of glycerol, diallyl ether of glycerol, monoallyl ether of ethylene glycol, monoallyl ether of diglycerol, diallyl ether of diglycerol, monoallyl ether of pentaerythritol, diallyl ether of pentaerythritol, and triallyl ether of pentaerythritol. If an unsaturated non-silicon-containing ether is used it is preferably diallyl ether of trimethylolpropane. These unsaturated non-silicon-containing ethers can lengthen the cure times particularly noticeable at lower temperatures. The amount of unsaturated non-silicon-containing ether used can effect the length of cure at lower temperatures. For this reason, small amounts of unsaturated non-silicon-containing ether is preferably used when it is desired to have it present. Such amounts are up to 1.5 weight percent based on the weight of the silicone composition, preferred amounts would be from about 0. 1 to 1.2 weight percent of unsaturated non-silicon-containing ether based on the weight of the silicone composition. The unsaturated non-silicon-containing ether is useful to provide silicone compositions with increased adhesive tensile strengths of the cured product. Therefore, one determines the value of curing time of the silicone composition verse adhesive tensile strength for the cured product for their particular application. For example, if fast cure is desired or required, the unsaturated non-silicon-containing ether may be left out of the silicone composition, but if the adhesive tensile strength of the cured product is more important to the particular application than the speed of the cure, then the unsaturated non-silicon-containing ether may be useful. Of course, if the smaller amounts of the unsaturated non-silicon-containing ether is used, one may improve the adhesive tensile strength of the cured product and maintain a reasonable curing time for the silicone composition at lower temperatures.

It is preferred to keep the titanium compound (F) separated from ingredient (B) during storage and therefore the most preferred silicone compositions are those which are packaged in at least two container. These preferred silicone compositions are stored by packaging in a first container which comprises ingredients (F) and (C), and in a second container which comprises ingredient (B). Convenient packaging for the silicone compositions of this invention are a first container in which ingredients (A), (C), (F), and a particulate filler, if used, are present; and a second container in which ingredients (B), (D), and (E) are present. It is also possible to divide ingredient (A) and particulate filler and put portions in both the first and second container. When unsaturated non-silicon-containing ethers are used, it is preferred to include such ethers in a first container with ingredients (F) and (C) for maximum storage stability and for the best results during curing and for the best results for the properties of the cured products.

In addition to the above ingredients, the silicone composition may include conventional additives which impart or enhance certain properties of the cured elastomer or facilitate processing of the curable composition. Typical additives include, but are not limited to, pigments, dyes, and heat and/or ultraviolet light stabilizers. The effect of any such additives should be evaluated as to their result and impact on other properties of the composition.

The compositions of this invention can be prepared by a simple mixing of the ingredients. However, when reinforcing fillers are included, the fillers are often treated in situ by first combining the polydiorganosiloxane, filler, filler treating agents and enough water to facilitate the filler treating process and then heating the mixture. For example, heating for 1 to 4 hours at about 170° C. has been found to provide good filler treatment. The heating may also be conducted at reduced pressure to assist in removing any excess water and the ammonia formed in the process. After filler treatment is completed the remaining components are simply mixed into the composition. The equipment needed for the mixing depends upon the viscosity of the polydiorganosiloxane used and the amount of filler.

When all of the ingredients are mixed together, the composition will begin to cure unless a cure inhibitor is present. If the composition is not to be used immediately after mixing, it should be prepared in at least two parts. If the organohydrogensiloxane, (B), is placed in one part and the platinum catalyst, (C), and the titanium compound, (F), are placed in another part, the individual parts will be shelf stable. The amounts of polydiorganosiloxane and filler that are placed in each part can be varied to obtain the desired result. A convenient system distributes the ingredients into two parts so that the polydiorganosiloxane and filler are divided equally between the two parts. The organohydrogensiloxane is added to one part and the platinum catalyst and the titanium compound are added to the other part. This results in a two-package composition where the contents of the two packages are mixed together in equal amounts. If the consistency of the two parts is about the same, they can be easily mixed at the time of use. Other proportions of the ingredients can of course be used, as well as more than two parts if desired.

For application, the contents of the two packages of the silicone composition are mixed together and extruded into place on the substrate or substrates to be adhered as a bead. After the bead is formed on the substrate or substrates to be adhered, it is allowed to cure at ambient temperatures or it can be heated to accelerate the cure. The bead adheres to the substrate upon curing. The silicone compositions of this invention adhere very well to stainless steel and glass substrates when the silicone composition is cured in contact with those substrates. Adhesion of the silicone composition to other substrates against which it is cured also exhibits adhesion.

The silicone compositions of this invention develop adhesion without the use of primers when the composition is cured against a substrate. These silicone compositions can be cured rapidly at low temperatures, such as from room temperature to 80° C. At room temperature, the silicone compositions can be cured in one or two hours, but at about 80° C., it can be cured in less than five minutes. The rubber obtained by curing the composition exhibits both dry and wet adhesion to the substrates. Dry adhesion is determined by measuring the adhesion of a substrate-rubber test piece over a defined period of time at a defined temperature. Wet adhesion is determined by measuring the adhesion of a substrate-rubber test piece which has been immersed in water for a defined period of time at a defined temperature. The silicone compositions can cure against substrates and develop sufficient initial adhesion to allow handling of articles which are bonded together using the silicone composition to bond substrates, such as glass and stainless steel. The cured silicone rubber also has sufficient tensile strength so that together with the initial adhesion between the silicone rubber and the substrates, an article can be handled without concern of deforming the article. This tensile strength-initial adhesion characteristic is termed "green strength" or initial tensile-adhesion. The cured silicone rubber should also maintain the tensile strengths throughout the useful lifetime of the adhesive-substrate bond. The silicone rubber obtained by curing the composition of this invention exhibits low thermal conductivity. A bubbling phenomenon at some substrate-rubber interfaces was observed with certain types of adhesion additives and when the titanium compound (F) and unsaturated non-silicon-containing ether (H) were stored in a package with the organohydrogensiloxane (B). One substrate against which the silicone composition was cured which was susceptible to such a bubbling phenomenon was polyisobutylene. Bubbling at a rubber-substrate interface means weak spots and reduced effectiveness of the seals which are intended by the use of the silicone composition with unprimed adhesion to substrates. During the development of this invention, bubbling was observed when an attempt was made to pre-react the titanium compound (F), the alkoxy-silicon compound (E), and the (epoxy-functional organo)trialkoxysilane (D). Also when the unsaturated non-silicon-containing ether was used with (F), (E), and (D), and the mixture was pre-reacted, bubbling was still observed at rubber-substrate interfaces. The presence of amino compounds in the silicone composition results in gassing and the wet adhesion is very poor, therefore although amino silicone compounds have been reported as adhesion promoter, there do not function in this kind of composition.

The following examples are included for illustrative purposes only and should not be construed as limiting the invention which is properly set forth in the appended claims. Parts are parts by weight.

EXAMPLE 1

Two-package compositions were prepared for use in evaluating various adhesion additives. The contents of each package was prepared with the ingredients as defined below.

Adhesion Additive Composition No. 1 (AAC No. 1)

Package A was prepared by mixing 92.8 parts of dimethylvinylsiloxy endblocked polydimethylsiloxane having a viscosity of about 55 Pa.s at 25° C. as measured by a rotational viscometer with a spindle number 5 at 4 rpm (Polymer A), 7.2 parts of a dimethylhexenylsiloxy endblocked poly(dimethylsiloxane-hexenylmethylsiloxane) having about 2 mole percent hexenylmethylsiloxane units and a viscosity at 25° C. of about 0.45 Pa.s (Polymer B), 20.5 parts of a hexamethyldisilazane treated fumed silica filler having a surface area of about 400 m²/g (Silica), 0.5 part of a platinum catalyst which was a reaction product of hexachloroplatinic acid and sym-tetramethyl-disiloxane diluted with a liquid dimethylvinylsiloxy terminated polydimethylsiloxane in an amount to achieve a platinum content of 0.7 weight percent (Platinum Catalyst), and 0.3 part of tetrabutyltitanate.

Package B was prepared by mixing 92.8 parts of Polymer A, 7.2 parts of Polymer B, 20.5 parts of Silica, 9.5 parts of trimethylsiloxy endblocked poly(dimethylsiloxane-methylhydrogensiloxane) having an average of about 3 dimethylsiloxane units and 5 methylhydrogensiloxane units per molecule (SiH Polymer), 4.2 parts of ethylpolysilicate, 7 part of gamma-glycidoxypropyltrimethoxysilane, and 2.4 parts of diallyl ether of trimethylolpropane.

Comparative Adhesion Addition Composition No. 1 (CAAC No. 1)

Package A was prepared by mixing 92.8 parts of Polymer A, 7.2 parts of Polymer B, 20.5 parts of Silica, 0.5 part of Platinum Catalyst, 0.3 part of tetrabutyltitanate.

Package B was prepared by mixing 92.8 parts of Polymer A, 7.2 parts of Polymer B, 20.5 parts of Silica, 9.4 parts of SiH Polymer, 4.8 parts of an alkoxy-silicon compound of the formula

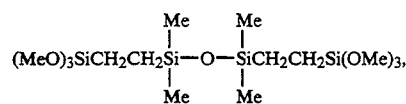

and 2.4 parts of diallyl ether of trimethylolpropane.

Comparative Adhesion Additive Composition No. 2 (CAAC No. 2)

Package A was prepared by mixing 92.8 parts of Polymer A, 7.2 parts of Polymer B, 20.5 parts of Silica, 0.5 part of Platinum Catalyst, 2.4 parts of gamma-glycicoxypropyltrimethoxysilane, and 1.2 parts of gamma-methacryloxypropyltrimethoxysilane.

Package B was prepared by mixing 92.8 parts of Polymer A, 7.2 parts of Polymer B, 20.5 parts of Silica, 4.6 parts of SiH Polymer, and 0.4 part of aluminum acetylacetonate added as a 5 percent by weight solution of aluminum acetylacetonate in toluene.

Comparative Adhesion Additive Composition No. 3 (CAAC No. 3)

Package A was prepared by mixing 92.8 parts of Polymer A, 7.2 parts of Polymer B, 20.5 parts of Silica, 0.5 part of Platinum Catalyst, 0.7 part of allyltrimethoxysilane, and 0.3 part of tetrabutyltitanate.

Package B was prepared by mixing 92.8 parts of Polymer A, 7.2 parts of Polymer B, 20.5 parts of Silica, and 4.5 parts of SiH Polymer.

Comparative Adhesion Additive Composition No. 4 (CAAC No. 4)

Package A was prepared by mixing 92.8 parts of Polymer A, 7.2 parts of Polymer B, 20.5 parts of Silica, 0.5 part of Platinum Catalyst, and 0.3 part of tetrabutyltitanate.

Package B was prepared by mixing 92.8 parts of Polymer A, 7.2 parts of Polymer B, 20.5 parts of Silica, 5.1 parts of SiH Polymer, 2.4 parts of gamma-methacryloxypropyltrimethoxy-silane, and 0.7 part of diallyl ether of trimethylolpropane.

Comparative Adhesion Additive Composition No. 5 (CAAC No. 5)

Package A was prepared by mixing 92.8 parts of Polymer A, 7.2 parts of Polymer B, 20.5 parts of Silica, and 0.5 part of Platinum Catalyst.

Package B was prepared by mixing 92.8 parts of Polymer A, 7.2 parts of Polymer B, 20.5 parts of Silica, and 3.3 parts of SiH Polymer.

Each of the above compositions were evaluated by mixing 50 parts of the contents of Package A with 50 parts of the contents of Package B and then curing on stainless steel and glass substrates for one hour at 80° C. The adhesion for the stainless steel substrates was determined by using a lap shear test with the results being reported in kilopascals (kPa). The lap shear test evaluated the adhesion of the silicone rubber to the stainless steel substrates making test laminates by placing a bead of silicone composition between two panels of stainless steel such that the panels with silicone composition laminated between them overlap by 6.4 square centimeters, the silicone composition was cured for one hour at 80° C., and then after a defined period of time as shown in Table 1, the panels were pulled in opposite directions and the force at which the silicone rubber-stainless steel laminate broke was recorded in kPa which is shown in Table 1. The adhesion for the glass substrate was determined by Tensile-Adhesion joint construction as specified in ASTM Test Method C 1135-90, "Standard Test Method for Tensile Adhesion Properties of Structural Sealants." The Tensile-Adhesion results were obtained on laminates in which the silicone rubber composition was 1.27 cm by 1.27 cm by 5.08 cm, the pull rate was 1.27 cm per minute, and are reported in Table 1 in kPa. Each silicone rubber composition was tested three times and the average of three test was used for each value reported. The adhesion for each kind of laminate was evaluated 24 hours after the silicone composition was cured, 2 weeks after being immersed in water at 80° C., and 4 weeks after being immersed in water at 80° C. The results were as shown in Table 1.

CAAC No. 5 was a control which contained no adhesion additives.

EXAMPLE 2

Two-package compositions were prepared for use in evaluating various adhesion additives in an assembly having glass and stainless steel substrates. The contents of each package was prepared with the ingredients as defined below.

Adhesion Additive Composition No. 2 (AAC No. 2)

Package A was prepared by mixing 94.7 parts of Polymer A, 5.3 parts of Polymer B, 17.9 parts of Silica, 0.36 part of Platinum Catalyst, 0.24 part of tetrabutyltitanate, and 1.2 part of diallyl ether of trimethylolpropane.

Package B was prepared by mixing 94.7 parts of Polymer A, 5.3 parts of Polymer B, 17.9 parts of Silica, 5.2 parts of SiH Polymer, 2.4 parts of ethylpolysilicate, and 0.6 part of gamma-glycidoxypropyltrimethoxysilane.

Adhesion Additive Composition No. 3 (AAC No. 3)

Package A was prepared as described for Package A of AAC No. 2.

Package B was prepared by mixing 94.7 parts of Polymer A, 5.3 parts of Polymer B, 17.9 parts of Silica, 5.2 parts of SiH Polymer, 2.1 parts of ethyl orthosilicate, and 0.6 part of gamma-glycidoxypropyltrimethoxysilane.

Adhesion Additive Composition No. 4 (AAC No. 4)

Package A was prepared as described for Package A of AAC No. 2.

Package B was prepared by mixing 94.7 parts of Polymer A, 5.3 parts of Polymer B, 17.9 parts of Silica, 5.2

TABLE 1

| COMPOSITION | SUBSTRATE | ADHESIVE STRENGTHS in kilopascals | | |
| --- | --- | --- | --- | --- |
| | | AFTER 24 HRS | AFTER 2 WKS WATER IMMERSION | AFTER 4 WKS WATER IMMERSION |
| AAC No. 1 | GLASS* | 1103 | 1103 | 931 |
| | STAINLESS STEEL** | 1379 | 1482 | 1641 |
| CAAC No. 1 | GLASS* | 419 | 1379 | 1379 |
| | STAINLESS STEEL** | 803 | 1379 | 1379 |
| CAAC No. 2 | GLASS* | 517 | 793 | 276 |
| | STAINLESS STEEL** | 2413 | 793 | 1276 |
| CAAC No. 3 | GLASS* | 552 | 517 | 310 |
| | STAINLESS STEEL** | 419 | 434 | 386 |
| CAAC No. 4 | GLASS* | 241 | 310 | 276 |
| | STAINLESS STEEL** | 1172 | 965 | 956 |
| CAAC No. 5 | GLASS* | 193 | 214 | 138 |
| | STAINLESS STEEL** | 103 | 228 | 103 |

*Adhesive strengths determined by Tensile-Adhesion Test.
**Adhesive strengths determined by Lap Shear Test.

CAAC No. 1 exhibited very good adhesion to both glass and stainless steel but was slow to develop the adhesive strength.

CAAC No. 2 showed very good 24 hour adhesion to stainless steel and only fair adhesion to glass and the adhesion to both the stainless steel and glass showed deterioration after hot water immersion.

CAAC No. 3 showed only minimal improvement in adhesion to both glass and stainless steel compared to CAAC No. 5 which contained no adhesion additive.

CAAC No. 4 exhibited very poor adhesion to glass and good adhesion to stainless steel.

parts of SiH Polymer, 2.7 parts of n-propyl orthosilicate, and 0.6 part of gamma-glycidoxypropyltrimethoxysilane.

Adhesion Additive Composition No. 5 (AAC No. 5)

Package A was prepared as described for Package A of AAC No. 2.

Package B was prepared by mixing 94.7 parts of Polymer A, 5.3 parts of Polymer B, 17.9 parts of Silica, 5.2 parts of SiH Polymer, 2.4 parts of ethylpolysilicate, and 0.6 part of beta-(3,4-epoxy-cyclohexyl)ethyltrimethoxysilane.

Adhesion Additive Composition No. 6 (AAC No. 6)

Package A was prepared by mixing 94.7 parts of Polymer A, 5.3 parts of Polymer B, 17.9 parts of Silica, 0.36 part of Platinum Catalyst, 1.2 part of diallyl ether of trimethylolpropane, and 0.3 part of a Ti—OCH compound of the formula

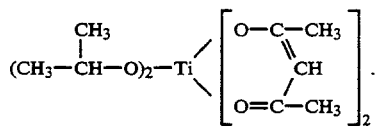

Package B was prepared as described for Package B of AAC No. 2.

Adhesion Additive Composition No. 7 (AAC No. 7)

Package A was prepared as described for Package A of AAC No. 2.

Package B was prepared by mixing 94.7 parts of Polymer A, 5.3 parts of Polymer B, 17.9 parts of Silica, 5.2 parts of a trimethylsiloxy endblocked polymethylhydrogensiloxane having a average of about 35 siloxane units per molecule, 2.4 parts of n-propyl orthosilicate, and 0.6 part of gamma-glycidoxypropyltrimethoxysilane.

Adhesion Additive Composition No. 8 (AAC No. 8)

Package A was prepared by mixing 94.7 parts of Polymer A, 5.3 parts of a dimethylvinylsiloxy endblocked poly(dimethylsiloxane-methylvinylsiloxane) having a viscosity of about 0.3 Pa.s and a vinyl content of about 1.15 weight percent (Polymer C), 17.9 parts of Silica, 0.36 part of Platinum Catalyst, 0.24 part of tetrabutyltitanate, and 1.2 part of diallyl ether of trimethylolpropane.

Package B was prepared by mixing 94.7 parts of Polymer A, 5.3 parts of Polymer C, 17.9 parts of Silica, 5.2 parts of SiH Polymer, 2.4 parts of ethylpolysilicate, and 0.6 part of gamma-glycidoxypropyltrimethoxysilane.

Adhesion Additive Composition No. 9 (AAC No. 9)

Package A was prepared by mixing 94.7 parts of Polymer A, 5.3 parts of Polymer B, 17.9 parts of Silica, 0.36 part of Platinum Catalyst, and 0.24 part of tetrabutyltitanate. Package B was prepared by mixing 94.7 parts of Polymer A, 5.3 parts of Polymer B, 17.9 parts of Silica, 2.8 parts of SiH Polymer, 2.6 parts of n-propyl orthosilicate, 0.6 part of gamma-glycidoxypropyltrimethoxysilane, and 0.35 part of gamma-methacryloxypropyltrimethoxysilane.

Comparative Adhesion Additive Composition No. 6 (CAAC No. 6)

Package A was prepared by mixing 94.7 parts of Polymer A, 5.3 parts of Polymer B, 17.9 parts of Silica, 0.36 part of Platinum Catalyst, and 1.2 part of diallyl ether of trimethylolpropane.

Package B was prepared by mixing 94.7 parts of Polymer A, 5.3 parts of Polymer B, 17.9 parts of Silica, 5.2 parts of SiH Polymer, 2.4 parts of ethylpolysilicate, and 0.6 part of gamma-glycidoxypropyltrimethoxysilane.

Comparative Adhesion Additive Composition No. 7 (CAAC No. 7)

Package A was prepared by mixing 94.7 parts of Polymer A, 5.3 parts of Polymer B, 17.9 parts of Silica, and 0.36 part of Platinum Catalyst.

Package B was prepared by mixing 94.7 parts of Polymer A, 5.3 parts of Polymer B, 17.9 parts of Silica, 2.5 parts of SiH Polymer, and 0.6 part of gamma-glycidoxypropyltrimethoxy-silane.

Comparative Adhesion Additive Composition No. 8 (CAAC No. 8)

Package A was prepared by mixing 94.7 parts of Polymer A, 5.3 parts of Polymer B, 17.9 parts of Silica, 0.36 part of Platinum Catalyst, and 0.24 part of tetrabutyltitanate. Package B was prepared by mixing 94.7 parts of Polymer A, 5.3 parts of Polymer B, 17.9 parts of Silica, 2.5 parts of SiH Polymer, and 0.6 part of gamma-glycidoxypropyltrimethoxy-silane.

Figure 2:
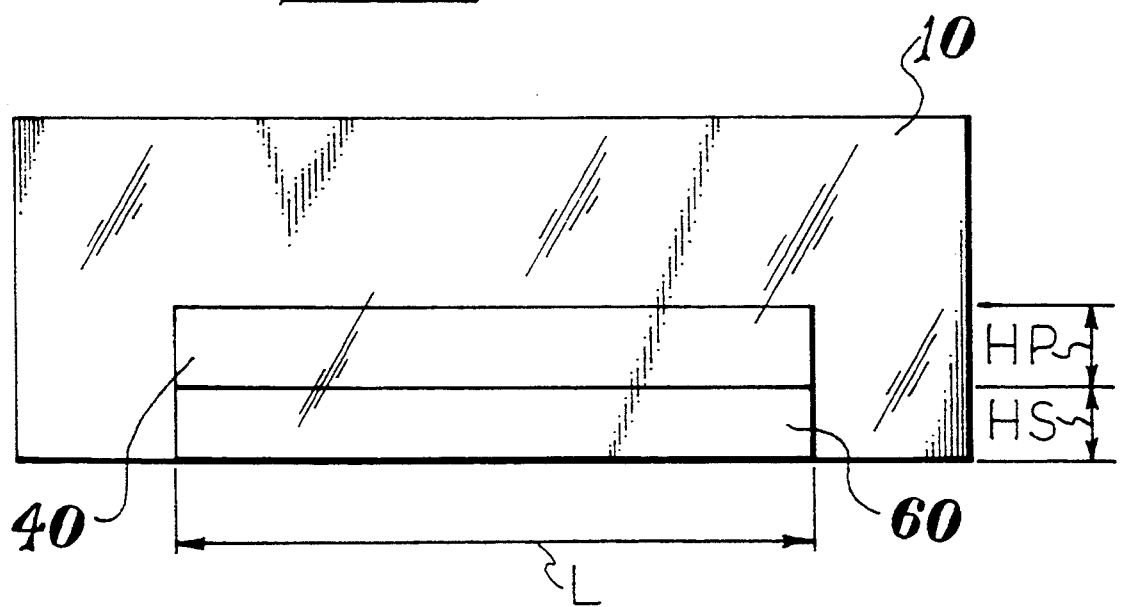
FIG. 2 is a side view of an H-test piece.

Each of the above compositions were evaluated by mixing 50 parts of the contents of Package A with 50 parts of the contents of Package B and then forming H-test pieces as shown in the drawings FIG. 1 and FIG. 2. The H-test pieces were form by placing stainless steel spacer 30 between two glass panes 10 and 20 with polyisobutylene primary seals 40 and 50 which had heights HP of 0.32 cm and lengths L of 5 cm and thereafter laying down a silicone rubber composition as secondary seals 60 and 70 which had heights HS of 0.32 cm, lengths L of 5 cm, and widths W of 0.32 cm. After the H-test piece was formed, it was heated to 80° C. for 15 minutes to cure the silicone rubber composition. Each H-test piece was exposed to various conditions and then tested for adhesion by clamping in a tensile testing type device which pulled the glass panes apart in direction 80 and 90 at the rate of 1.27 cm per minute. The tensile adhesion was measured and reported in Table 2 in newtons (N). The percentage cohesive failure for the stainless steel-silicone rubber interface and for the glass-silicone rubber interface was also recorded and is shown in Table 2. The conditions of exposure were as follows: (1) 1 day at room temperature; (2) 14 days at room temperature; (3) 7 days at room temperature and 2 weeks immersed in water at 80° C.; and (4) 7 days at room temperature and 4 weeks immersed in water at 80° C. The test results (an average of three test) obtained were as shown in Table 2.

The curing characteristics of the silicone rubber compositions were observed by using a commercially available oscillating rheometer. The results were obtained for cure at room temperature and at 80° C., for each silicone rubber composition after it was prepared (initial) and for each silicone rubber composition stored two weeks at 50° C. before mixing the contents of Package A and Package B (aged). The elapsed times in minutes were observed for each composition to exhibit 50 percent ($T_{50}$) and 90 percent ($T_{90}$) of the maximum torque value (F, reported in newton-meters, N-m) exhibited by the cured silicone rubber and were as reported in Table 3.

TABLE 2

| EXPOSURE | TEST OBSERVATIONS | SILICONE RUBBER COMPOSITION | | | | | | | | | | |
| --- | --- | --- | --- | --- | --- | --- | --- | --- | --- | --- | --- | --- |
| | | AAC NO. 2 | AAC NO. 3 | AAC NO. 4 | AAC NO. 5 | AAC NO. 6 | AAC NO. 7 | AAC NO. 8 | AAC NO. 9 | CAAC NO. 6 | CAAC NO. 7 | CAAC NO. 8 |
| (1) | TENSILE-ADHESION, N | 151 | 254 | 196 | 138 | 151 | 129 | 151 | 222 | 116 | 147 | 142 |
| | ELONGATION, % | 48 | 153 | 100 | 24 | 44 | 17 | 38 | 94 | 10 | 8 | 7 |
| | COHESIVE | 100 | 100 | 100 | 100 | 100 | 100 | 100 | 100 | 100 | 100 | 100 |

TABLE 2-continued

| EXPOSURE | TEST OBSERVATIONS | SILICONE RUBBER COMPOSITION | | | | | | | | | | |
|---|---|---|---|---|---|---|---|---|---|---|---|---|
| | | AAC NO. 2 | AAC NO. 3 | AAC NO. 4 | AAC NO. 5 | AAC NO. 6 | AAC NO. 7 | AAC NO. 8 | AAC NO. 9 | CAAC NO. 6 | CAAC NO. 7 | CAAC NO. 8 |
| | COHESIVE FAILURE, % GLASS | | | | | | | | | | | |
| | COHESIVE FAILURE, % STAINLESS STEEL | 25 | 90 | 68 | 2 | 18 | 0 | 23 | 82 | 0 | 0 | 0 |
| (2) | TENSILE-ADHESION, N | 262 | 311 | 338 | 245 | 249 | 240 | 276 | 334 | 151 | 160 | 156 |
| | ELONGATION, % | 113 | 143 | 154 | 103 | 95 | 85 | 125 | 132 | 18 | 42 | 38 |
| | COHESIVE FAILURE, % GLASS | 100 | 100 | 100 | 100 | 100 | 100 | 100 | 100 | 100 | 100 | 100 |
| | COHESIVE FAILURE, % STAINLESS STEEL | 70 | 97 | 98 | 60 | 85 | 57 | 98 | 100 | 0 | 3 | 8 |
| (3) | TENSILE-ADHESION, N | 262 | 356 | 387 | 280 | 231 | 125 | 245 | 320 | 298 | 89 | 125 |
| | ELONGATION, % | 68 | 118 | 128 | 77 | 50 | 15 | 65 | 97 | 82 | 8 | 16 |
| | COHESIVE FAILURE, % GLASS | 100 | 100 | 100 | 100 | 40 | 3 | 100 | 100 | 100 | 100 | 100 |
| | COHESIVE FAILURE, % STAINLESS STEEL | 95 | 97 | 98 | 100 | 100 | 95 | 97 | 100 | 90 | 0 | 0 |
| (4) | TENSILE-ADHESION, N | 280 | 307 | 298 | 178 | 240 | 138 | 276 | 298 | 249 | 67 | 107 |
| | ELONGATION, % | 69 | 98 | 81 | 31 | 54 | 19 | 73 | 79 | 58 | 4 | 12 |
| | COHESIVE FAILURE, % GLASS | 42 | 100 | 75 | 8 | 20 | 33 | 50 | 98 | 93 | 0 | 0 |
| | COHESIVE FAILURE, % STAINLESS STEEL | 87 | 98 | 100 | 100 | 100 | 67 | 98 | 87 | 40 | 100 | 100 |

From Table 2, CAAC No. 6 showed that without the presence of the tetrabutyl titanate, comparing it to AAC No. 2, the adhesion to stainless steel at room temperature was very slow to develop and essentially showed no cohesive failure after 14 days at room temperature. CAAC No. 7 and CAAC No. 8 showed that an (epoxy-functional organo) silane with or without tetrabutyl titanate did not provide adhesion to stainless steel at room temperature after 14 days and failed adhesively after hot water immersion either to the glass substrate or to the stainless steel substrate. AAC No. 5 showed that beta-(3,4-epoxy cyclohexyl)ethyltrimethoxysilane developed adhesion to both stainless steel and glass between one day and 14 days at room temperature. This showed that the beta-(3,4-epoxycyclohexyl)ethyltrimethoxysilane was not as effective in developing adhesion to stainless steel as gamma-glycidoxypropyltrimethoxysilane as shown for AAC No. 2. AAC No. 9 showed a composition which quickly developed tensile adhesion to both glass substrates and stainless steel substrates. The cure characteristics were as shown in Table 3.

TABLE 3

| CURE TEMPERATURE | CURE PROPERTIES (INITIAL OR AGED) | SILICONE RUBBER COMPOSITION | | | | | | | | | | |
|---|---|---|---|---|---|---|---|---|---|---|---|---|
| | | AAC NO. 2 | AAC NO. 3 | AAC NO. 4 | AAC NO. 5 | AAC NO. 6 | AAC NO. 7 | AAC NO. 8 | AAC NO. 9 | CAAC NO. 6 | CAAC NO. 7 | CAAC NO. 8 |
| 80°C | T50 (INT) | 1.5 | 1.6 | 1.5 | 1.6 | 1.1 | 1.7 | 2.3 | 0.5 | 1.5 | 0.5 | 0.5 |
| | T50 (AGED) | 2.5 | 2.9 | 2.9 | 2.7 | 1.8 | 4.7 | 4.1 | 0.5 | 1.1 | — | — |
| | T90 (INT) | 2.4 | 2.6 | 2.3 | 2.6 | 1.9 | 3.4 | 3.4 | 0.9 | 2.3 | 1.2 | 1.2 |
| | T90 (AGED) | 3.8 | 4.3 | 4.2 | 4.0 | 3.3 | 8.8 | 6.9 | 2.0 | 2.0 | — | — |
| | TORQUE, N-m | | | | | | | | | | | |
| | F-INITIAL | 3.84 | 3.78 | 4.01 | 3.70 | 3.95 | 5.65 | 4.01 | 4.57 | 3.78 | 4.35 | 4.35 |
| | F-AGED | 3.50 | 3.45 | 3.45 | 3.45 | 3.73 | 5.76 | 3.84 | 4.35 | 3.73 | — | — |
| ROOM TEMPERATURE | T50 (INT) | 173 | 173 | 178 | 218 | 140 | 308 | 218 | 20 | 178 | 28 | 29 |
| | T90 (INT) | 223 | 225 | 243 | 275 | 195 | 408 | 264 | 43 | 233 | 73 | 70 |
| | F-INITIAL | 3.11 | 3.28 | 3.11 | 3.16 | 3.16 | 4.18 | 3.62 | 4.12 | 3.56 | 4.63 | 4.63 |

EXAMPLE 3

Adhesion Additive Composition No. 10 (AAC No. 10)

Package A was prepared by mixing 92.6 parts of Polymer A, 7.4 parts of Polymer B, 18.5 parts of Silica, 0.5 part of Platinum Catalyst, and 0.3 part of tetrabutyltitanate.

Package B was prepared by mixing 92.6 parts of Polymer A, 7.4 parts of Polymer B, 18.5 parts of Silica, 4.2 parts of ethylpolysilicate, 0.5 part of gamma-glycidoxypropyltrimethoxysilane, 8.6 parts of SiH Polymer, and 2.4 parts of diallyl ether of trimethylolpropane.

A composition was prepared by mixing 50 parts of the contents of Package A with 50 parts of the contents of Package B. The resulting composition was used to make several H-test pieces as described in Example 2, except that in place of the stainless steel spacer, an aluminum spacer was used and one glass substrate was a clear glass and the other glass substrate was a coated glass which had been abraded. The silicone compositions of the H-test pieces was cured by heating to 80° C. for 15 minutes. Test pieces were evaluated after 7 days at room temperature (RT), 14 days at room temperature, and after immersion in water at 60° C. for 7 days, 14 days, 28 days, 42 days, 56 days, and 70 days. In each situation, the bond failure was 100 % cohesive to the aluminum substrate, the glass substrate, and the coated abraded glass substrate. The tensile adhesion in newtons was as shown in Table 4:

TABLE 4

| H-TEST PIECE EXPOSURE | TENSILE ADHESION, newtons |
|---|---|
| 7 days RT | 464 |
| 14 days RT | 538 |
| IMMERSION | |
| 7 days | 468 |
| 14 days | 463 |
| 28 days | 513 |
| 42 days | 494 |
| 56 days | 371 |
| 70 days | 454 |

EXAMPLE 4

Adhesion Additive Composition No. 11 (AAC No. 11)

Package A was prepared by mixing 94.7 parts of Polymer A, 5.3 parts of Polymer B, 17.9 parts of Silica, 0.36 part of Platinum Catalyst, 0.24 part of tetrabutyltitanate, and 0.6 part of diallyl ether of trimethylolpropane.

Package B was prepared by mixing 94.7 parts of Polymer A, 5.3 parts of Polymer B, 17.9 parts of Silica, 3.9 parts of SiH Polymer, 2.6 parts of n-propyl orthosilicate, and 0.59 part of gamma-glycidoxypropyltrimethoxysilane. The molar ratio of n-propyl ortho silicate to gamma-glycidoxypropyltrimethoxysilane was 3.93:1
Comparative Adhesion Additive Composition No. 9 (CAAC No. 9)

Package A was prepared by mixing 94.7 parts of Polymer A, 5.3 parts of Polymer B, 17.9 parts of Silica, 0.35 part of Platinum Catalyst, and 4.0 parts of a pre-reacted mixture (1). The pre-reacted mixture (1) was prepared by mixing 0.19 part of tetrabutyltitanate, 0.48 part of gamma-glycidoxypropyltrimethoxysilane, 2.12 parts of n-propyl orthosilicate, and 0.48 part of diallyl ether of trimethylolpropane, heating the resulting mixture to 90° C. for one hour and then stripping at 90° C. and 12 kPa for 30 minutes. The molar ratio of n-propyl ortho silicate to gamma-glycidoxypropyltrimethoxysilane was 3.93:1.

Package B was prepared by mixing 94.7 parts of Polymer A, 5.3 parts of Polymer B, 17.9 parts of Silica, and 3.8 parts of SiH Polymer.
Adhesion Additive Composition No. 12 (AAC No. 12)

Package A was prepared by mixing 94.7 parts of Polymer A, 5.3 parts of Polymer B, 17.9 parts of Silica, 0.36 part of Platinum Catalyst, and 0.24 part of tetrabutyltitanate.

Package B was prepared by mixing 94.7 parts of Polymer A, 5.3 parts of Polymer B, 17.9 parts of Silica, 2.8 parts of SiH Polymer, 2.6 parts of n-propyl orthosilicate, 0.35 part of gamma-methacryloxypropyltrimethoxysilane, and 0.58 part of gamma-glycidoxypropyltrimethoxysilane. The molar ratio of n-propyl orthosilicate to gamma-glycidoxypropyltrimethoxysilane was 3.93:1.
Comparative Adhesion Additive Composition No. 10 (CAAC No. 10)

Package A was prepared by mixing 94.7 parts of Polymer A, 5.3 parts of Polymer B, 17.9 parts of Silica, and 3.77 parts of pre-reacted mixture (2). The pre-reacted mixture (2) was prepared by mixing 0.23 part of tetrabutyltitanate, 2.6 parts of n-propyl ortho silicate, 0.35 part of gamma-methacryloxypropyltrimethoxysilane, and 0.59 part or gamma-glycidoxypropyltrimethoxysilane, heating the resulting mixture to 90° C. for one hour, and stripping at 90° C. and 12 kPa for 30 minutes. The molar ratio of n-propyl orthosilicate to gamma-glycidoxypropyltrimethoxysilane was 3.93:1.

Package B was prepared by mixing 94.7 parts of Polymer A, 5.3 parts of Polymer B, 17.9 parts of Silica, and 2.8 parts of SiH Polymer.
Comparative Adhesion Additive Composition No. 11 (CAAC No. 11)

Package A was prepared by mixing 94.7 parts of Polymer A, 5.3 parts of Polymer B, 17.9 parts of Silica, 0.36 part of Platinum Catalyst, 0.1 part of tetrabutyltitanate, and 0.7 part of diallyl ether of trimethylolpropane.

Package B was prepared by mixing 94.7 parts of Polymer A, 5.3 parts of Polymer B, 17.9 parts of Silica, 4.1 parts of SiH Polymer, 1.7 parts of tetraethyl orthosilicate, and 2.4 parts of gamma-glycidoxypropyltrimethoxysilane. The molar ratio of tetraethyl orthosilicate to gamma-glycidoxypropyltrimethoxysilane was 0.82:1.
Comparative Adhesion Additive Composition No. 12 (CAAC No. 12)

Package A was prepared by mixing 94.7 parts of Polymer A, 5.3 parts of Polymer B, 17.9 parts of Silica, 0.36 part of Platinum Catalyst, and 4.9 parts of pre-reacted mixture (3). The pre-reacted mixture (3) was prepared by mixing 0.1 part of tetrabutyltitanate, 1.7 parts of tetraethyl orthosilicate, 2.4 parts of gamma-glycidoxypropyltrimethoxysilane, 0.7 part of diallyl ether of trimethylolpropane, heating the resulting mixture to 90° C. for one hour, and stripping at 90° C. and 12 kPa for 30 minutes. The molar ratio of tetraethyl orthosilicate to gamma-glycidoxypropyltrimethoxysilane was 0.82:1.

Package B was prepared by mixing 94.7 parts of Polymer A, 5.3 parts of Polymer B, 17.9 parts of Silica, and 4.1 parts of SiH Polymer.
Comparative Adhesion Additive Composition No. 13 (CAAC No. 13)

Package A was prepared by mixing 94.7 parts of Polymer A, 5.3 parts of Polymer B, 17.9 parts of Silica, 0.36 part of Platinum Catalyst, 0.08 part of tetrabutyltitanate, and 0.7 part of diallyl ether of trimethylolpropane.

Package B was prepared by mixing 94.7 parts of Polymer A, 5.3 parts of Polymer B, 17.9 parts of Silica, 4.0 parts of SiH Polymer, 1.9 parts of n-propyl orthosilicate, and 2.2 parts of gamma-glycidoxypropyltrimethoxysilane. The molar ratio of n-propyl orthosilicate to gamma-glycidoxypropyltrimethoxysilane was 0.8:1.

Comparative Adhesion Additive Composition No. 14 (CAAC No. 14)

Package A was prepared by mixing 94.7 parts of Polymer A, 5.3 parts of Polymer B, 17.9 parts of Silica, and 4.9 parts of pre-reacted mixture (4). The pre-reacted mixture was prepared by mixing 0.08 part of tetrabutyltitanate, 2.2 part of gamma-glycidoxypropyltrimethoxysilane, 1.9 parts of n-propyl orthosilicate, and 0.7 part of diallyl ether of trimethylolpropane, heating the resulting mixture to 90° C. for one hour, stripping at 90° C. and 12 kPa for 30 minutes. The molar ratio of n-propyl orthosilicate to gamma-glycidoxypropyltrimethoxysilane was 0.8:1.

Package B was prepared by mixing 94.7 parts of Polymer A, 5.3 parts of Polymer B, 17.9 parts of Silica, and 4.0 parts of SiH Polymer.

Each of the above compositions were evaluated by preparing H-test pieces as described in Example 2, and by observing the adhesion properties as described in Example 2 where test pieces were evaluated after (1) one day at room temperature, (2) 14 days at room temperature, (3) 7 days at room temperature and 14 days immersion in water at 80° C., and (4) 7 days at room temperature and 28 days immersion in water at 80° C. The curing characteristics of each composition was evaluated as described in Example 2. The results of the evaluations were as shown in Table 5 and Table 6.

TABLE 5

| EXPOSURE | TEST OBSERVATIONS | SILICONE RUBBER COMPOSITION | | | | | | | |
|---|---|---|---|---|---|---|---|---|---|
| | | AAC NO. 11 | CAAC NO. 9 | AAC NO. 12 | CAAC NO. 10 | CAAC NO. 11 | CAAC NO. 12 | CAAC NO. 13 | CAAC NO. 14 |
| (1) | TENSILE-ADHESION, N | 294 | 173* | 245 | 142 | 157 | 157* | 157 | 138* |
| | ELONGATION, % | 148 | 71 | 127 | 44 | 61 | 81 | 52 | 46 |
| | COHESIVE FAILURE, % GLASS | 100 | 100 | 100 | 100 | 100 | 100 | 100 | 100 |
| | COHESIVE FAILURE, % STAINLESS STEEL | 88 | 42 | 80 | 2 | 5 | 47 | 17 | 2 |
| (2) | TENSILE-ADHESION, N | 427 | 289* | 369 | 205* | 302 | 302* | 356 | 271* |
| | ELONGATION, % | 179 | 144 | 148 | 82 | 143 | 164 | 157 | 139 |
| | COHESIVE FAILURE, % GLASS | 100 | 100 | 100 | 100 | 100 | 100 | 100 | 100 |
| | COHESIVE FAILURE, % STAINLESS STEEL | 100 | 92 | 100 | 60 | 88 | 100 | 98 | 98 |
| (3) | TENSILE-ADHESION, N | 356 | 245* | 227 | 187* | 129 | 133* | 107 | 138* |
| | ELONGATION, % | 113 | 92 | 50 | 55 | 18 | 16 | 11 | 20 |
| | COHESIVE FAILURE, % GLASS | 90 | 100 | 0 | 50 | 0 | 0 | 0 | 0 |
| | COHESIVE FAILURE, % STAINLESS STEEL | 100 | 93 | 100 | 70 | 100 | 100 | 100 | 100 |
| (4) | TENSILE-ADHESION, N | 191 | 200* | 182 | 160* | 111 | 93* | 98 | 102* |
| | ELONGATION, % | 39 | 50 | 39 | 31 | 10 | 12 | 11 | 11 |
| | COHESIVE FAILURE, % GLASS | 50 | 58 | 20 | 0 | 0 | 0 | 0 | 0 |
| | COHESIVE FAILURE, % STAINLESS STEEL | 100 | 100 | 100 | 100 | 100 | 100 | 100 | 100 |

*Bubble formation was observed at the interface between the polyisobutylene primary seals 40 and 50 and the silicone rubber secondary seals 60 and 70.

TABLE 6

| CURE TEMPERATURE | CURE PROPERTIES INITIAL | SILICONE RUBBER COMPOSITION | | | | | | | |
|---|---|---|---|---|---|---|---|---|---|
| | | AAC NO. 11 | CAAC NO. 9 | AAC NO. 12 | CAAC NO. 10 | CAAC NO. 11 | CAAC NO. 12 | CAAC NO. 13 | CAAC NO. 14 |
| 80°C | T50 (INT) | 0.9 | 0.7 | 0.6 | 0.4 | 1.0 | 0.5 | 1.3 | 0.4 |
| | T90 (INT) TORQUE, N-m | 1.8 | 1.5 | 1.5 | 0.9 | 2.2 | 1.0 | 3.9 | 0.75 |
| | F-INITIAL | 4.18 | 4.07 | 4.29 | 4.18 | 4.01 | 3.95 | 3.84 | 3.95 |
| ROOM TEMPER- | T50 (INT) | 98 | 61 | 40 | 45 | 113 | 48 | 143 | 48 |
| | T90 (INT) | 148 | 108 | 83 | 125 | 160 | 80 | 208 | 83 |

TABLE 6-continued

| CURE TEMPER- ATURE | CURE PROPERTIES INITIAL | SILICONE RUBBER COMPOSITION ||||||||
|---|---|---|---|---|---|---|---|---|---|
| | | AAC NO. 11 | CAAC NO. 9 | AAC NO. 12 | CAAC NO. 10 | CAAC NO. 11 | CAAC NO. 12 | CAAC NO. 13 | CAAC NO. 14 |
| ATURE | F-INITIAL | 4.07 | 3.73 | 4.24 | 3.62 | 3.73 | 3.62 | 3.62 | 3.67 |

Pre-reacting the ingredients added to provide adhesion to the silicone compositions does not provide satisfactory wet adhesion as shown by CAAC No. 10, CAAC No. 12, and CAAC No. 14. CAAC No. 11 and CAAC No. 13 illustrated the need to have the moles of alkoxy-silicon compound exceed the moles of (epoxy-functional organo) trialkoxysilane.

That which is claimed is:

1. A silicone composition curable to a rubber comprising
    (A) 100 parts by weight of an alkenyl-containing polydiorganosiloxane having an average of at least two silicon-bonded alkenyl radicals per molecule where the alkenyl radical has from 2 to 10 carbon atoms per radical, each organo radical of the polydiorganosiloxane being a monovalent radical selected from the group consisting of hydrocarbon radicals and fluorinated alkyl radicals both having less than 7 carbon atoms per radical, the polydiorganosiloxane having triorganosiloxy endgroups,
    (B) an organohydrogensiloxane having an average of at least 3 silicon-bonded hydrogen atoms per molecule and valences of any silicon atom in the organohydrogensiloxane not satisfied by a hydrogen atom is satisfied by a divalent oxygen atom or an organo radical wherein each organo radical is a monovalent radical selected from the group consisting of hydrocarbon radicals and fluorinated alkyl radicals both having less than 7 carbon atoms per radical, the organohydrogensiloxane having no more than one silicon-bonded hydrogen atom on any one silicon atom, the amount of organohydrogensiloxane providing a ratio of silicon-bonded hydrogen atoms to alkenyl groups from the polydiorganosiloxane of 1.2 to 2,
    (C) a hydrosilation catalyst containing platinum,
    (D) 0.1 to 1 part by weight of an (epoxy-functional organo)trialkoxysilane where the alkoxy radicals of the (epoxy-functional organo)trialkoxy-silane have 1 to 4 inclusive carbon atoms,
    (E) 0.25 to 5 parts by weight of an alkoxy-silicon compound selected from tetraalkyl orthosilicates, alkylpolysilicates or alkoxy-silicon compounds of the general formula

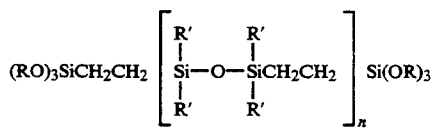

wherein B is 0 or 1, R is an alkyl radical of 1 to 4 inclusive carbon atoms and R' is a monovalent hydrocarbon radical, where the alkyl groups of the tetraalkyl orthosilicates and the alkylpolysilicates are methyl, ethyl, propyl or butyl, and
    (F) 0.01 to 0.5 part by weight of a titanium compound having Ti—O—CH bonds,
where the total amount of ingredient (D) and ingredient (E) is from 0.5 to 6 parts by weight and the molar amount of (E) exceed the molar amount of (D).

2. The silicone composition according to claim 1 further comprising a particulate filler.

3. The silicone composition according to claim 1 in which the composition is stored in two containers, a first container comprising ingredients (A), (C) and (F) and a second container comprising ingredients (B), (D), and (E).

4. The silicone composition according to claim 1 further comprising (G) at least 0.1 part by weight of a gamma-methacryloxypropyltrialkoxysilane in which the alkoxy has from 1 to 4 inclusive carbon atoms per alkoxy group.

5. The silicone composition according to claim 2 further comprising (G) at least 0.1 part by weight of a gamma-methacryloxypropyltrialkoxysilane in which the alkoxy has from 1 to 4 inclusive carbon atoms per alkoxy group.

6. The silicone composition according to claim 3 further comprising (G) at least 0.1 part by weight of a gamma-methacryloxypropyltrialkoxysilane in which the alkoxy has from 1 to 4 inclusive carbon atoms per alkoxy group.

7. The silicone composition according to claim 1 further comprising diallyltrimethylol propane ether.

8. The silicone composition according to claim 2 further comprising diallyltrimethylol propane ether.

9. The silicone composition according to claim 3 further comprising diallyltrimethylol propane ether which is in the first container.

10. The silicone composition according to claim 4 further comprising diallyltrimethylol propane ether.

11. The silicone composition according to claim 5 further comprising diallyltrimethylol propane ether.

12. The liquid silicone composition of claim 1 wherein the (epoxy-functional organo)trialkoxysilane is selected from the group consisting of 3-glycidoxypropyltrialkoxysilanes and beta-(3,4-epoxycyclohexyl)ethyltrialkoxysilanes.

13. The liquid silicone composition of claim 12 where the (epoxy-functional organo)trialkoxysilane is 3-glycidoxypropyltrimethoxysilane.

14. A method of adhering a glass substrate to a stainless steel substrate comprising
    (1) mixing
        (A) 100 parts by weight of an alkenyl-containing polydiorganosiloxane having an average of at least two silicon-bonded alkenyl radicals per molecule where the alkenyl radical has from 2 to 10 carbon atoms per radical, each organo radical of the polydiorganosiloxane being a monovalent radical selected from the group consisting of hydrocarbon radicals and fluorinated alkyl radicals both having less than 7 carbon atoms per radical, the polydiorganosiloxane having triorganosiloxy endgroups,
        (B) an organohydrogensiloxane having an average of at least 3 silicon-bonded hydrogen atoms per molecule and valences of any silicon atom in the organohydrogensiloxane not satisfied by a hydrogen atom is satisfied by a divalent oxygen atom or an organo radical wherein each organo radical is a monovalent radical selected from the group consisting of hydrocarbon radicals and fluorinated alkyl radicals both having less than 7 carbon atoms per radical, the organohydrogensiloxane having no more than one silicon-bonded hydrogen atom on any one silicon atom, the amount of organohydrogensiloxane providing a ratio of silicon-bonded hydrogen atoms to alkenyl groups from the polydiorganosiloxane of 1.2 to 2, (C) a hydrosilation catalyst containing platinum, (D) 0.1 to 1 part by weight of an (epoxy-functional organo)trialkoxysilane where the alkoxy radicals of the (epoxy-functional organo)trialkoxy-silane have 1 to 4 inclusive carbon atoms, (E) 0.25 to 5 parts by weight of an alkoxy-silicon compound selected from tetraalkyl orthosilicates, alkylpolysilicates or alkoxy-silicon compounds of the general formula

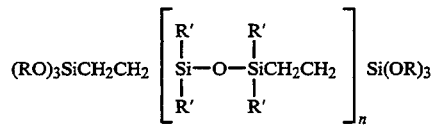

wherein n is 0 or 1, R is an alkyl radical of 1 to 4 inclusive carbon atoms and R' is a monovalent hydrocarbon radical, where the alkyl groups of the tetraalkyl orthosilicates and the alkylpolysilicates are methyl, ethyl, propyl or butyl, and (F) 0.01 to 0.5 part by weight of a titanium compound having Ti—O—CH bonds, where the total amount of ingredient (D) and ingredient (E) is from 0.5 to 6 parts by weight and the molar amount of (E) exceed the molar amount of (D), to make a curable silicone rubber composition, (2) applying the curable silicone rubber composition to a glass substrate and a stainless steel substrate such that the glass and stainless steel substrates are connected by curable silicone rubber composition making an assembly, and thereafter (3) maintaining the assembly in position until the silicone rubber composition has cured thereby bonding the glass substrate to the stainless steel substrate through cured silicone rubber.

15. The method according to claim 14 in which the curable silicone rubber composition is stored in two container prior to forming the curable silicone composition, where a first container comprises ingredients (A), (C) and (F) and a second container comprises ingredients (B), (D), and (E).

16. The method according to claim 14 further comprising a thermoplastic material in combination with the glass substrate, stainless steel substrate, and curable silicone rubber composition such that the curable silicone rubber composition contacts the thermoplastic material, the glass substrate, and the stainless steel substrate during step (3) and the assembly is heated to accelerate curing.

17. The method according to claim 15 further comprising a thermoplastic material in combination with the glass substrate, stainless steel substrate, and curable silicone rubber composition such that the curable silicone rubber composition contacts the thermoplastic material, the glass substrate, and the stainless steel substrate during step (3) and the assembly is heated to accelerate curing.

* * * * *